United States Patent Office 3,655,673
Patented Apr. 11, 1972

3,655,673
PROCESS FOR THE PREPARATION OF OXAZOLIDINONE DERIVATIVES
Jacques Georges Maillard, Paris, France, assignor to Laboratoires Jacques Logeais, Issy-les-Moulineauz, France
Filed Mar. 23, 1970, Ser. No. 21,646
Claims priority, application France, Mar. 25, 1969, 6908663
Int. Cl. C07d 29/30
U.S. Cl. 260—293.66
13 Claims

ABSTRACT OF THE DISCLOSURE

This process for the preparation of 5-(piperidine-4-spiro)-oxazolidin-2-ones of formula:

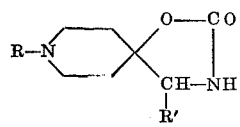

in which

R is a hydrocarbon group, in particular alkyl or aralkyl, and

R′ is hydrogen or a hydrocarbon group, in particular alkyl or aryl, comprises condensing a piperidone N-substituted with the R group with a nitrile of formula CH$_2$R′—CN, converting the resulting hydroxynitrile to the corresponding amide by a reaction, at least completed in alkaline medium, with hydrogen peroxide, followed by reduction of the resulting N-oxide, and effecting the ring closure of the amide into the desired oxazolidinone derivative.

---

This invention relates to a process for the preparation of oxazolidinones and, more particularly, of 5-(piperidine-4-spiro)-oxazolidin-2-ones.

Figure 1:
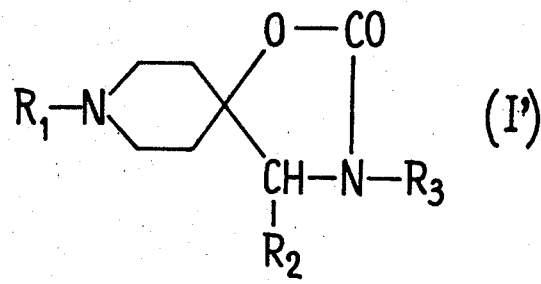

In French patent for medicine B.S.M. No. M 6,704 and in French Patent No. 1,5344,468 are disclosed compounds of the Formula I′ illustrated in FIG. 1 of the accompanying drawing, in which:

R$_1$ is hydrogen, an alkyl, aralkyl or ω-aroylalkyl group,
R$_2$ is an alkyl or aryl group, and
R$_3$ is hydrogen, an alkyl, alkenyl, alkynyl, alkanoyl, aralkyl or aroyl group.

By aryl, aralkyl, aroyl and aroylalkyl groups are also meant nuclearly substituted groups of this type, particularly with halogen, alkyl, hydroxy alkoxy, amino and alkylamino substituents.

These compounds have anti-arrhythmic and anti-fibrillating properties. They have also useful analgesic and tranquilizing properties that may have appreciable contributory effects in the treatment of cardio-vascular diseases.

Until now, they were prepared by reacting 1-benzyl-4-cyano-4-hydroxy piperidine, whose hydroxyl group is protected by addition onto the dihydropyran, with an organo-magnesium halide of formula R$_2$MgX, hydrolyzing the resulting magnesium derivative and hydrogenating the hydrolysis product, thereby obtaining a 1-benzyl-4-hydroxy-4-aminomethyl piperidine substituted with group R$_2$ on the methyl group, reacting this amine with a carbonyl derivative such as a carbonic diester, thereby obtaining compound (I′) in which R$_1$ is a benzyl group, then introducing in said compound the desired R$_1$ substituent, by hydrogenation and optionally reaction with an alkyl halide or tosylate R$_1$X.

Although it comprises a number of steps and is somewhat lengthy, this process gives satisfactory yields.

A shorter process, giving higher yields, has now been found. In addition, handling of toxic hydrocyanic acid required for the production of starting 1-benzyl-4-cyano-4-hydroxy piperidine is now avoided.

The process according to the invention permits to prepare not only said active compounds but also closely related compounds, for instance compounds in which R$_2$ is hydrogen or in which R$_1$ and/or R$_2$ have a more sophisticated meaning. These last compounds may be converted into said active compounds by substitution reactions as disclosed in the above-mentioned patents.

For instance, R$_1$ or R$_2$ may be removed by hydrogenation and then the compound is reacted with a reagent R$_1$′X, R$_1$′ having such a meaning as to obtain an active compound and X being halogen or a tosyl group.

Also when R$_3$ is hydrogen, it is possible to convert the compound by reaction with a reagent R$_3$′X after replacement of the hydrogen to be substituted with an alkali metal.

Figure 2:
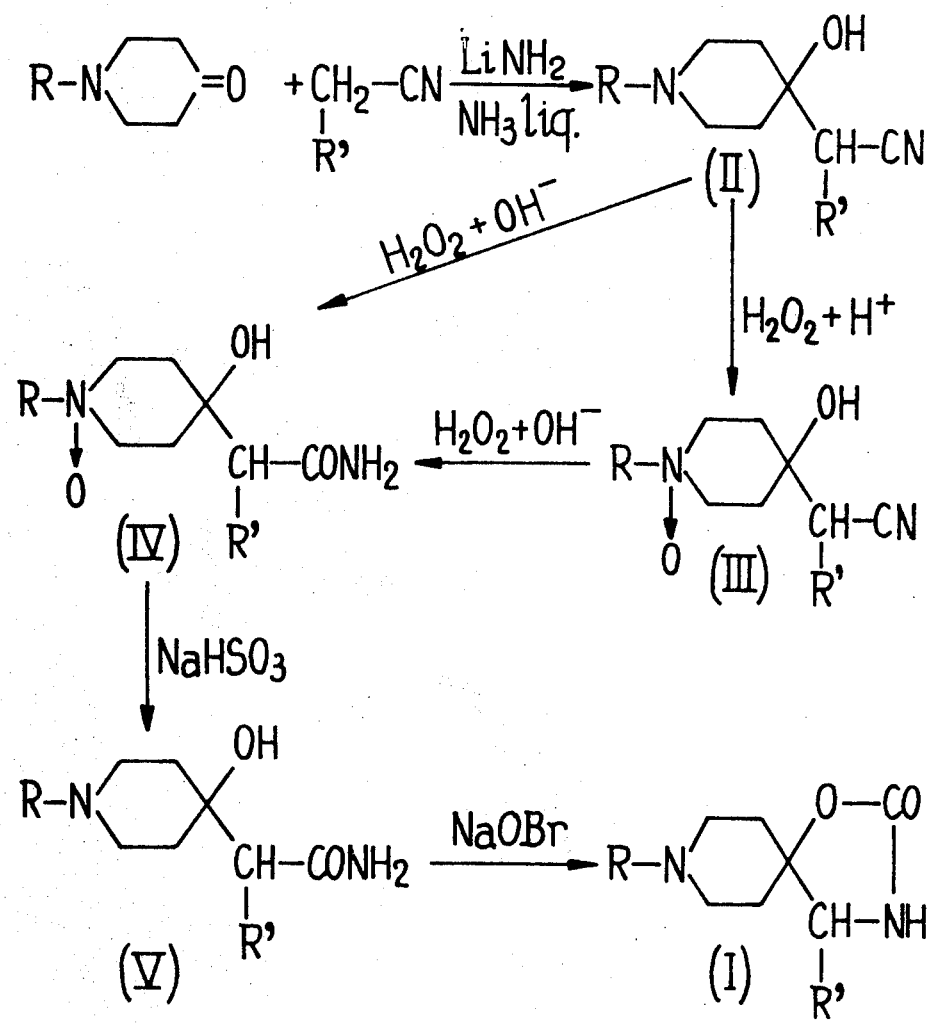

Therefore, the invention relates to a general process for the preparation of 5-(piperidine-4-spiro)-oxazolidin-2-ones of Formula I illustrated in FIG. 2 of the accompanying drawing, in which R is a hydrocarbon group, particularly alkyl or aralkyl and R′ is hydrogen or a hydrocarbon group, particularly an alkyl or aryl group, comprising condensing a piperidone N-substituted with group R with a nitrile of formula CH$_2$R′CN, converting the resulting hydroxynitrile to the corresponding amide, by a reaction with hydrogen peroxide at least completed in alkaline medium and followed by reduction of the resulting N-oxide, and then effecting the ring closure of the amide into the desired oxazolidinone derivative.

The various steps of the process according to this invention will be examined below in greater detail, with reference to FIG. 2.

The first step comprises condensing a piperidone with a nitrile CH$_2$R′—CN.

This condensation may be effected in liquid ammonia, in the presence of an alkali metal amide, particularly of lithium amide. Advantageously, there is used a deficiency of ketone, both with respect to the nitrile and to the lithium amide which are, on their part, used in stoichiometrically corresponding amounts. Thus, 5 moles of nitrile may be used per one mole of piperidone.

The second step of the process comprises converting hydroxynitrile (II) resulting from the first step to corresponding amide (IV).

This conversion may be effected by reacting hydroxynitrile (II) with hydrogen peroxide. When operating right away in alkaline medium, direct conversion of the nitrile function to the amide and attachment of an oxygen atom to the nitrogen of the piperidine ring is obtained.

When operating at first in acidic medium, only the latter modification is effected and it is convenient to operate anew in alkaline medium, preferably after isolation of the resulting N-oxide (III), to obtain also the amide function.

In any case, this or these reaction(s) should be completed in alkaline medium, for example at a pH above about 10, to obtain amide (IV) and not only N-oxide (III).

The reaction is carried out at moderate temperature, for example at about 20° C., to avoid decomposition of the hydrogen peroxide.

Some hydroxynitriles (II) being sparingly water-soluble, the reaction may be effected in an aqueous-alcoholic medium more favourable to the solubilisation.

The N-oxide function introduced should then be removed. For this purpose, the N-oxide function of amide (IV) may be reduced with a convenient reducing agent such as a borohydride, by catalytic hydrogenation, and the like. The industrially preferable reducing agent is sodium bisulfite. When using the latter, the reaction medium should be drastically cooled to compensate for the exothermy of the reaction.

The last step of the process comprises effecting the ring closure of amide (V) resulting from the preceding step to the desired oxazolidinone derivative (I).

This ring closure may be effected by reacting the amide in aqueous medium with an alkali metal hypobromite, for example sodium hypobromite, between 20 and 100° C., and using substantially equimolar ratios of both reagents, or a slight excess of hypobromite.

The following examples are given to further illustrate the invention.

EXAMPLE 1

R=$C_6H_5CH_2$  R'=$C_2H_5$

1st step, preparation of (II)

Finely divided lithium (7 g.; 1 gram-atom) is dissolved in liquid ammonia (1300 ml.) containing crystalline ferric nitrate 0.1 g.). After stirring during 1 hour, a grey lithium amide solution is obtained. 69 g. (1 mole) butyronitrile dissolved in 60 ml. ether and 37.8 g. (0.2 mole) 1-benzyl-4-piperidone dissolved in 100 ml. ether are successively added thereto. After stirring during one hour, $NH_4Cl$ (1 mole) is added to the reaction mixture, the ammonia is evaporated and the mixture is taken up into 100 ml. water and 100 ml. ether. The ether phase is washed with water, after which it is distilled and the residue is fractionated by distillation, to give 37 g. (71%) of liquid boiling at 150–155° C., which crystallizes slowly.

*Analysis.*—Calculated (percent): C, 74.38; H, 8.58; N, 10.84. Found (percent): C, 74.40; H, 8.80; N, 10.89.

2nd step, preparation of (V)

Hydroxynitrile (II) (25.8 g.; 0.1 mole) is dissolved in methanol (115 ml.). 2 N sodium hydroxide (50 ml.; 0.1 mole) is added thereto followed, after cooling to 20–25° C., by 30% hydrogen peroxide (55.6 ml.; 0.54 mole). The mixture is left standing at 18–20° C. during 17 hours, after which the methanol is evaporated under reduced pressure. Water (20 ml.) is then added to the reaction mixture, followed by the slow addition, with stirring and drastic cooling, of a 4.4 N sodium bisulfite solution (d.=1.32). After 24 hours at room temperature, the mixture is made alkaline with excess 5 N sodium hydroxide which precipitates a gummy product. This product is dried and dissolved in boiling acetonitrile; on cooling, 21.6 g. (78.5%) of material, M.P.=162.5–164° C. (M.P.=164–5° C. after recrystallization from ethyl acetate) crystallizes from the filtered solution.

*Analysis.*—Calculated (percent): C, 69.50; H, 8.75; N, 10.14. Found (percent): C, 69.44; H, 8.95; N, 10.20.

Modification of the 2nd step.—Above hydroxynitrile (II) (2.5 g.; 0.01 mole) is dissolved in $CH_3COOH$ (15 ml.) and 30% hydrogen peroxide (7.5 ml.) and heated 2.5 hours at 70° C. After further addition of $H_2O_2$ (7.5 ml.) and further heating at 70° C. during 2 hours, the reaction mixture is evaporated under reduced pressure, over a water-bath at 40° C. The residue is dissolved in water (50 ml.) and the solution is filtered through resin. After washing the eluates, 0.5 N ammonia is passed through the column. After evaporation to dryness, the eluate leaves 2.25 g. (82%) of N-oxide (III). M.P. (inst.)=260° C. (dec.).

*Analysis.*—Calculated (percent): C, 70.05; H, 10.23; N, 10.22. Found (percent): C, 70.30; H, 8.28; N, 10.28.

The reaction mixture is then taken up into water and treated with $H_2O_2$ in basic medium and then with $NaHSO_3$, as in the other modification.

3rd step, preparation of (I)

A fresh sodium hypobromite solution is prepared at 0° C., using bromine (0.5 g.) and 2 N sodium hydroxide (16 ml.). Amide (V) (0.74 g.; 0.026 mole) is then added thereto, with stirring and at 0° C. After stirring during 3 hours at 2–10° C., the reaction mixture is then heated 40 minutes at 50° C. The solid which precipitates is suction filtered, washed, dried and recrystallized from methanol: water 2:3, to give 0.7 g. (96%) of crystals, M.P.=172° C. (instantaneous).

*Analysis.*—Calculated (percent): C, 70.03; H, 8.08; N, 10.22. Found (percent): C, 69.24; H, 8.16; N, 10.02.

EXAMPLE 2

R=$C_6H_5CH_2$  R'=$CH_3$

1st step, preparation of (II)

To a suspension of lithium amide in liquid ammonia, prepared as described in Example 1, are added propionitrile (55 g.; 1 mole) dissolved in ether (60 ml.) followed by 1-benzyl-4-piperidone (37.8 g.; 0.2 mole) dissolved in ether (100 ml.). The mixture is stirred during one hour and is then treated in the same manner as Example 1, to give 30.6 g. (62.5%) of liquid B.P.$_{0.2}$=143–146° C., which crystallizes slowly, M.P. 80–82° C.

*Analysis.*—Calculated (percent): C, 73.73; H, 8.25; N, 11.47. Found (percent): C, 73.50; H, 8.46; N, 11.56.

2nd step, preparation of (V)

Above hydroxynitrile (II) (14.7 g.; 0.06 mole) is dissolved in methanol (70 ml.) and treated with 2 N sodium hydroxide (30 ml.; 0.06 mole) and 30% hydrogen peroxide (33.4 ml.; 0.032 mole), at first at +10° C. and then at 0° C., as in the preceding example. After destroying excess hydrogen peroxide and reducing the N-oxide with $NaHSO_3$, a gummy product is precipitated and is then purified by dissolution in methanol, filtration and evaporation of the solvent to dryness, followed by crystallization from methyl ethyl ketone, to give 9.2 g. (57%) of amide (V), M.P.=158.5–159° C.

*Analysis.*—Calculated (percent): C, 68.67; H, 8.45; N, 10.68. Found (percent): C, 68.80; H, 8.60; N, 10.65.

3rd step, preparation of (I)

Above amide (V) is treated with a sodium hypobromite solution at first at 2–10° C. and then at 50° C., as in Example 1. The precipitated material is recrystallized from water, M.P. 160° C.

*Analysis.*—Calculated (percent): C, 69.20; H, 7.74; N, 10.76. Found (percent): C, 69.12; H, 7.78; N, 10.70.

EXAMPLE 3

R=$C_6H_5CH_2$  R'=$C_6H_5$

1st step, preparation of (II)

To a suspension of lithium amide in liquid ammonia, prepared as in Example 1, are added phenylacetonitrile (31 g.; 0.25 mole) dissolved in ether (25 ml.) followed by 1-benzyl-4-piperidone (10 g.; 0.05 mole) dissolved in ether (25 ml.). After treating in the manner previously described, evaporation of the extraction solvent gives a solid product which is purified by washing with boiling petroleum ether. M.P.=139° C. Yield: 76%.

*Analysis.*—Calculated (percent): C, 78.39; H, 7.24; N, 9.14. Found (percent): C, 78.35; H, 7.58; N, 9.04.

2nd step (a) Preparation of (IV).—Above hydroxynitrile (II) (12 g.) is dissolved in methanol (150 ml.) and treated with 2 N sodium hydroxide (21 ml.) and 30% hydrogen peroxide (23.8 ml.). After 18 hours at room temperature the methanol is distilled under reduced pressure and the reaction mixture is neutralized with $H_2SO_4$ and evaporated to dryness. The residue is taken up into methanol (300 ml.) which dissolves the organic product and leaves the insoluble inorganic salts. The methanol is evaporated and the residue is dissolved in water and is then passed through "Dowex 50," a sulfonic resin, and eluted with N/2 ammonia. Evaporation of the ammonia leaves a residue purified by dissolution in absolute ethanol, in the hot, and washing with petroleum ether. M.P.=208–210° C. (dec.).

*Analysis.*—Calculated (percent): C, 70.56; H, 7.10; N, 8.23. Found (percent): C, 70.40; H, 7.32; N, 8.23.

(b) Preparation of (V).—4 g. of the preceding N-oxide are suspended in water (200 ml.) and treated with a 4.4 N sodium bisulfite solution (23 ml.). After stirring during 16 hours and filtration of the insoluble, the filtrate is made alkaline, to give a precipitate which is filtered, washed with water, dried and crystallized from carbon tetrachloride.

M.P.=174° C.

*Analysis.*—Calculated (percent): C, 74.04; H, 7.46; N, 8.04. Found (percent): C, 73.77; H, 7.70; N, 8.70.

3rd step, preparation of (I)

Above amide (V) is treated with a sodium hypobromite solution as in Example 1. The ultimate product is recrystallized from acetonitrile. M.P.=209–210° C.

*Analysis.*—Calculated (percent): C, 74.50; H, 6.87. Found (percent): C, 74.42; H, 6.78.

EXAMPLE 4

R=C$_6$H$_5$CH$_2$  R'=H

1st step, preparation of (II)

This preparation is effected as in the preceding examples, from acetonitrile and 1-benzyl-4-piperidone. The final product is purified by distillation. B.P. 168–172° C./0.3 mm. Yield: 83%.

*Analysis.*—Calculated (percent): C, 73.01; H, 7.88; N, 12.17. Found (percent): C, 72.80; H, 8.06; N, 12.26.

2nd step (a) Preparation of (IV).—Obtained by treatment of above hydroxynitrile (II) with hydrogen peroxide and sodium hydroxide in methanol, as in Example 3. M.P=260° C. (dec.).

*Analysis.*—Calculated (percent): C, 63.60; H, 7.63; N, 10.60. Found (percent): C, 63.63; H, 7.72; N, 10.75.

(b) Preparation of (V).—Obtained by reduction of above N-oxide (IV) with sodium bisulfite, as described in Example 3. M.P.=173° C. Yield: 70%.

*Analysis.*—Calculated (percent): C, 66.71; H, 8.12; N, 11.28. Found (percent): C, 67.67; H, 8.41; N, 11.50.

3rd step, preparation of (I)

Above amide (IV) is treated with sodium hypobromite as in Example 1. The final product is recrystallized from benzene. M.P.=180° C.

EXAMPLE 5

R=iC$_3$H$_7$  R'=C$_2$H$_5$

1st step, preparation of (II)

The procedure of the preceding examples is used, from butyronitrile and 1-isopropyl-4-piperidone. The final product is purified by distillation.

B.P.=112–116° C./0.4 mm. Yield=70%.

*Analysis.*—Calculated (percent): C, 68.52; H, 10.54; N, 13.32. Found (percent): C, 68.49; H, 10.70; N, 13.20.

2nd step (a) Preparation of (IV).— By treatment of above hydroxynitrile (II) with hydrogen peroxide and sodium hydroxide in methanol, as in Example 3. M.P.=174–176° C. Yield: 90%.

*Analysis.*—Calculated (percent): C, 58.98; H, 9.90; N, 11.47. Found (percent); C, 59.06; H, 10.11; N, 11.58.

(b) Preparation of (V).—By reduction of above N-oxide (IV) by catalytic hydrogenation using palladium-on-charcoal, in ethanol, at normal pressure and at room temperature. M.P.=160° C. Yield: 98%.

*Analysis.*—Calculated (percent) C, 63.12; H, 10.59; N, 12.27. Found (percent): C, 62.90; H, 10.59; N, 12.40.

3rd step, preparation of (I)

Above amide (V) is treated with sodium hypobromite as in Example 1. The final product is recrystallized from cyclohexane. M.P.=130° C. Yield=60%.

*Analysis.*—Calculated (percent): C, 63.68; H, 9.80; N, 12.38. Found (percent): C, 63.40; H, 10.00; N, 12.44.

EXAMPLE 6

R=CH$_3$  R'=C$_2$H$_5$

1st step, preparation of (II)

As in the preceding examples, from butyronitrile and 1-methyl-4-piperidone, the ether extracted material is converted to the hydrochloride. The base is released over "Dowex 50" ion exchange resin, eluted with ammonia and then recrystallized from cyclohexane. M.P.=98° C.

*Analysis.*—Calculated (percent): C, 65.89; H, 9.95; N, 15.37. Found (percent): C, 65.80; H, 10.27; N, 15.34.

2nd step. preparation of (IV)

The preparation is carried out by treatment of above hydroxynitrile (II) with hydrogen peroxide and sodium hydroxide in methanol, as in Example 1. Due to its high water-solubility, amide (V) was not stripped from accompanying inorganic salts, but was submitted in crude form to the subsequent ring closure step.

3rd step, preparation of (I)

Above crude amide (V) is treated with sodium hypobromite, as in Example 1. The product is isolated by passing through "Dowex 50" ion exchange resin, and is then eluted with ammonia and crystallized from cyclohexane, M.P.=110° C.

*Analysis.*—Calculated (percent): C, 60.58; H, 9.15; N, 14.13. Found percent): C, 60.29; H, 9.29; N, 14.19.

What I claim and desire to secure by Letters Patent is:

1. Process for the preparation of 5-(piperidine-4-spiro)-oxazolidin-2-ones of formula:

$$R-N\underset{}{\bigcirc}\begin{matrix}O-CO\\|\\CH-NH\\|\\R'\end{matrix}$$

in which R is a hydrocarbon group and R' is a member selected from the group consisting of hydrogen and the hydrocarbon groups, comprising condensing a piperidone N-substituted with the R group with a nitrile of formula CH$_2$R'—CN in the presence of alkali-metal amide in liquid ammonia, converting the resulting hydroxynitrile to the corresponding amide by a reaction with hydrogen peroxide at least completed in alkaline medium, reducing the resulting N-oxide and effecting the ring closure of said amide to the desired oxazolidinone derivative by reacting said amide with alkali-metal hypobromite.

2. Process as claimed in claim 1, wherein the oxazolidinones in which R is a member selected from the group consisting of the alkyl and aralkyl groups and R' is a member selected from the group consisting of hydrogen, the alkyl and aryl groups are prepared.

3. Process as claimed in claim 1, wherein the condensation is effected in the presence of lithium amide in liquid ammonia.

4. Process as claimed in claim 1, wherein the condensation is effected in the presence of a deficiency of piperidone.

5. Process as claimed in claim 1, wherein the reaction with hydrogen peroxide is effected in a solvent medium for the hydroxynitrile.

6. Process as claimed in claim 5, wherein the reaction with hydrogen peroxide is effected in aqueous-alcoholic medium.

7. Process as claimed in claim 1, wherein the reaction is effected at a temperature of about 20° C., at a pH above about 10.

8. Process as claimed in claim 1, wherein the N-oxide is reduced using sodium bisulfite.

9. Process as claimed in claim 1, wherein the N-oxide is reduced by catalytic hydrogenation.

10. Process as claimed in claim 1, wherein ring closure of the amide is effected by reacting same with an alkali metal hypobromite.

11. Process as claimed in claim 1, wherein the alkali metal hypobromite is sodium hypobromite.

12. Process as claimed in claim 1, wherein ring closure of the amide is effected in aqueous medium between 20 and 100° C., using substantially equimolar ratios of both reagents.

13. Process as claimed in claim 1, wherein ring closure of the amide is effected in aqueous medium between 20 and 100° C., using excess hypobromite.

References Cited

UNITED STATES PATENTS

| | | | |
|---|---|---|---|
| 3,399,192 | 8/1968 | Regnier et al. | 260—240 |
| 3,491,110 | 1/1970 | Maillard et al. | 260—307 |

HENRY R. JILES, Primary Examiner

G. T. TODD, Assistant Examiner

U.S. Cl. X.R.

260—293.75, 293.76, 293.86, 293.9